(12) United States Patent
Wen et al.

(10) Patent No.: US 12,608,039 B2
(45) Date of Patent: Apr. 21, 2026

(54) SYSTEM AND METHOD FOR TIME SYNCHRONIZATION BETWEEN MULTIPLE OPERATING SYSTEMS

(71) Applicant: Schneider Electric Industries SAS, Rueil-Malmaison (FR)

(72) Inventors: Zerui Wen, Shanghai (CN); Yongfeng Lei, Shanghai (CN); Fengyue Ren, Shanghai (CN); Chuanhua Zhou, Shanghai (CN)

(73) Assignee: Schneider Electric Industries SAS, Rueil-Malmaison (FR)

( * ) Notice: Subject to any disclaimer, the term of this patent is extended or adjusted under 35 U.S.C. 154(b) by 157 days.

(21) Appl. No.: 18/241,509

(22) Filed: Sep. 1, 2023

(65) Prior Publication Data

US 2024/0103563 A1 Mar. 28, 2024

(30) Foreign Application Priority Data

Sep. 26, 2022 (CN) .......................... 202211174237.2

(51) Int. Cl.
*G06F 1/12* (2006.01)
(52) U.S. Cl.
CPC ..................................... *G06F 1/12* (2013.01)
(58) Field of Classification Search
CPC ........................................................ G06F 1/12
See application file for complete search history.

(56) References Cited

U.S. PATENT DOCUMENTS

| | | | | | |
|---|---|---|---|---|---|
| 10,868,664 | B2 * | 12/2020 | Goldin | ...................... | H04L 7/08 |
| 2014/0331075 | A1 * | 11/2014 | Morris | ...................... | G06F 1/04 |
| | | | | | 713/502 |
| 2015/0134864 | A1 * | 5/2015 | Foster | ...................... | G06F 1/12 |
| | | | | | 710/106 |
| 2015/0326383 | A1 * | 11/2015 | Wong | ................... | H04B 7/0413 |
| | | | | | 375/267 |
| 2021/0303021 | A1 * | 9/2021 | Cui | ...................... | H04J 3/0667 |
| 2022/0050495 | A1 * | 2/2022 | Bismuth | ............... | H04J 3/0685 |
| 2023/0039814 | A1 * | 2/2023 | Abbott | ...................... | G04F 5/14 |

OTHER PUBLICATIONS

Extended European Search Report dated Feb. 2, 2024 for corresponding European Patent Application No. 23306458.3-1224, 8 pages.

* cited by examiner

*Primary Examiner* — Phil K Nguyen
*Assistant Examiner* — Ayman Fatima
(74) *Attorney, Agent, or Firm* — Wolf, Greenfield & Sacks, P.C.

(57) ABSTRACT

A system for time synchronization between multiple operating systems is provided, the system includes a Field Programmable Gate Array (FPGA) configured to obtain and maintain absolute time; and multiple operating systems (OS) that obtain the absolute time from the FPGA and perform time synchronization based on the obtained absolute time. According to the embodiments of the present disclosure, the system can solve the high accuracy time synchronization problem in a protection relay device with multiple operating systems.

15 Claims, 2 Drawing Sheets

Synchronous Acquisition

SYSTEM AND METHOD FOR TIME SYNCHRONIZATION BETWEEN MULTIPLE OPERATING SYSTEMS

CROSS-REFERENCE TO RELATED APPLICATION(S)

This application claims priority of the Chinese Patent Application No. 202211174237.2 filed on Sep. 26, 2022, the content disclosed in which is incorporated herein by reference in its entirety.

TECHNICAL FIELD

The present disclosure relates to the time synchronization between multiple operating systems, and more specifically, to a system and method for solving the high accuracy time synchronization problem in a protection relay device with multiple operating systems.

BACKGROUND

Protection relay is an important measure for detecting faults or abnormal situations in the power system, to issue alarm signals, or directly isolating and removing the faulty parts. Therefore, the protection relay device must correctly distinguish whether the protected element is in normal operation or has a fault, and whether a fault inside the protected area or a fault outside the protected area.

Previous protection relay device only includes a single operating system, which is single-operating-system device. A protection relay device including multiple operating systems is proposed now, and each operating system can get time with high accuracy by accessing the Field Programmable Gate Array registers and perform time synchronization, thereby leading to an improvement in the performance of a protection relay device.

SUMMARY

According to an aspect of an embodiment of the present disclosure, a system for time synchronization between multiple operating systems is provided, the system comprises a Field Programmable Gate Array (FPGA) configured to obtain and maintain absolute time; and multiple operating systems (OS) that obtain the absolute time from the FPGA and perform time synchronization based on the obtained absolute time.

In one example, the system further comprises one or more external clock sources. In one example, the FPGA obtains the absolute time comprising: obtaining time information from one of the one or more external clock sources and decoding the time information to obtain the absolute time; and/or obtaining the absolute time from one of the multiple OSs.

In one example, the one or more external clock sources comprise Precise Time Protocol (PTP), IRIG-B code and/or other network time protocols.

In one example, the multiple OSs comprise Linux and VxWorks.

In one example, the VxWorks is dedicated for processing a task with a high real-time requirement in the system.

In one example, the system further comprises a main board and one or more daughter boards coupled to the main board, wherein the FPGA and the multiple OSs are disposed on the main board.

In one example, the FPGA is further configured to transmit a one pulse per second (1PPS) signal to the one or more daughter boards.

In one example, the main board further comprises an oscillator and an internal counter.

In one example, the FPGA maintains absolute time comprising: increasing the absolute time, by the internal counter, based on the oscillator on the main board.

In one example, the one or more daughter boards are configured to receive the 1PPS signal; detect a digital input (DI) event; generate a timestamp; and transmit a DI event message and the timestamp to the main board based on detecting the DI event, wherein the timestamp indicates the time deviation between the DI event and the rising edge of the 1PPS signal.

According to another aspect of the embodiment of the present disclosure, a method for time synchronization between multiple operating systems is provided, the method comprises: obtaining and maintaining absolute time by a programmable logic array (FPGA); and obtaining the absolute time from the FPGA and performing time synchronization based on the obtained absolute time by multiple operating systems (OS).

According to yet another aspect of the embodiment of the present disclosure, a protection relay device is provided, the device includes a system for time synchronization between multiple operating systems. According to yet another aspect of an embodiment of the present disclosure, a protection relay device is provided, the device performs a method for time synchronization between multiple operating systems.

Therefore, according to the embodiment of the present disclosure, the proposed system and method can solve the high accuracy time synchronization problem in a protection relay device with multiple operating systems.

BRIEF DESCRIPTION OF DRAWINGS

The present invention will be understood more easily from the following detailed description with the aid of the accompanying drawings, in which the same reference numerals indicate units of the same structure, and in which.

DETAILED DESCRIPTION

The following will describe the technical scheme in the embodiment of the invention clearly and completely in conjunction with the accompanying drawings in the embodiments of the present invention. Obviously, the described embodiments are a part of the embodiments of the invention, but not all embodiments. Based on the embodiments in the present invention, all other embodiments obtained by those skilled in the art without making creative efforts belong to the scope of protection of the present invention.

Figure 1:
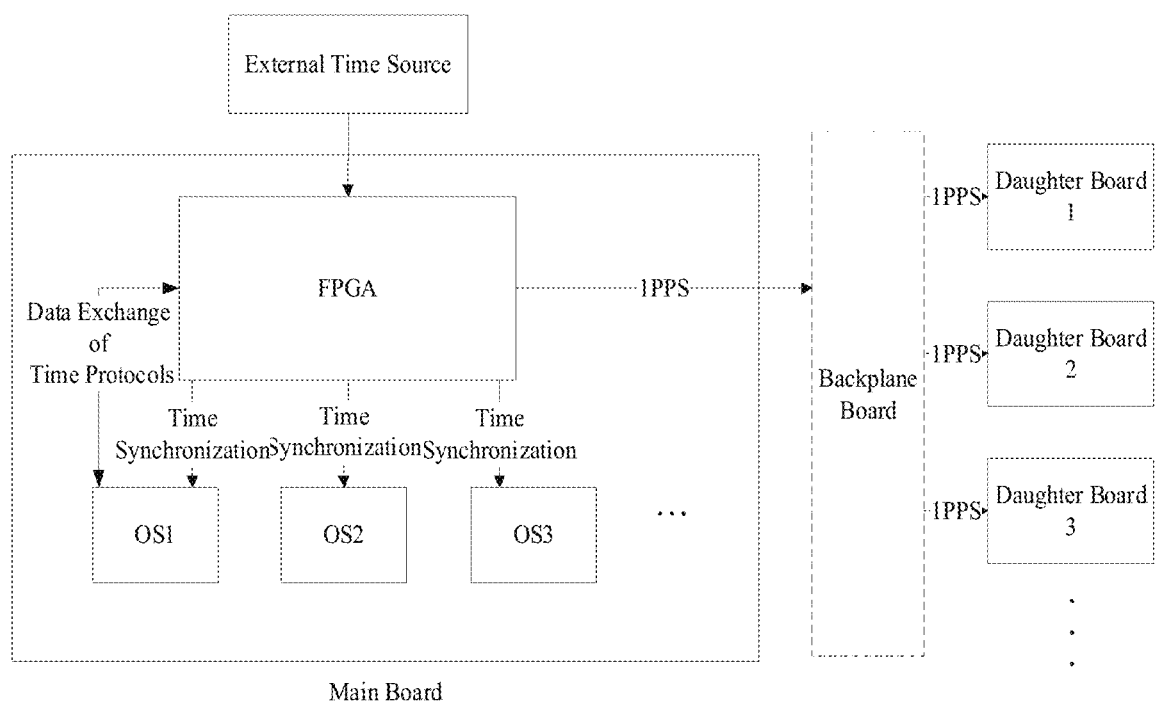
FIG. 1 illustrates an example system for time synchronization between multiple operating systems according to an embodiment of the present disclosure.

FIG. 1 illustrates an example system for time synchronization between multiple operating systems according to an embodiment of the present disclosure.

As shown in FIG. 1, the example system includes one or more external clock sources, a Field Programmable Gate Array (FPGA), multiple operating systems (OS), a main board, a backplane board, and one or more daughter boards, wherein the FPGA and the multiple OSs are disposed on the main board. Additionally or alternatively, the main board may also include an oscillator and an internal counter.

The one or more external clock sources can provide time information. The one or more external clock sources may include Precise Time Protocol (PTP), IRIG-B code and/or other network time protocols. Specifically, one device may include multiple types of clock sources providing time information at the same time, but the device can select one clock source from the multiple clock sources as a main clock source, and other clock sources as alternative clock sources. When the main clock source fails, the device can receive time information from the alternate clock sources.

FPGA can serve as a time master in the example system. Specifically, for some types of clock sources, such as IRIG-B, the FPGA can obtain the time information from external clock sources directly and decode the time information to obtain the absolute time. However, for other types of clock sources, such as PTP, the FPGA cannot receive and decode the time information independently, so OS is needed to participate in processing and transmit the processing results to the FPGA, that is, the FPGA obtains the absolute time from OS. In some embodiments, the FPGA performs data exchange of time protocols with one of the multiple OSs. For example, in the embodiment of PTP timing, the FPGA performs data exchange of time protocols with one of the multiple OSs, and the FPGA completes the function of generating timestamps for related PTP messages and provides the timestamps to one of the multiple OSs, the OS processes the time information in combination with other message information to obtain the absolute time and provides the absolute time to the FPGA for time correction. For other network time protocols (such as NTP), message processing is completed by one of the multiple OSs, and FPGA only needs to receive the processing result from the OS and complete time correction.

The FPGA further maintains the absolute time after obtaining the absolute time. In some embodiments, the FPGA can increase the absolute time by an internal counter based on an oscillator on the main board.

The FPGA can also transmit signals to the daughter boards. In some embodiments, the FPGA transmits a one pulse per second (1PPS) signal to the one or more daughter boards. In some embodiments, the FPGA may transmit a 1PPS signal to the one or more daughter boards via the backplane board. In other embodiments, the backplane board can be omitted, as shown in FIG. 1, wherein the dashed line indicates that the backplane board can be omitted.

The multiple OSs can obtain the absolute time from the FPGA for time synchronization. In some embodiments, the multiple OSs can the obtain absolute time from the FPGA, which improves the real-time operation of the multiple OSs. If the multiple OSs obtain the absolute time from one OS instead of the FPGA, the real-time operation between the multiple OSs will get worse. Specifically, the multiple OSs may include Linux and VxWorks or any suitable types of OS. VxWorks is dedicated for processing a task with a high real-time requirement in the system, such as digital input (DI) event messages, analog sample input (SV) and so on. In some embodiments, one of the multiple OSs can perform data exchange of time protocols with FPGA, that is, perform time correction on FPGA. In some embodiments, one or more of the multiple OSs may receive event messages from the one or more daughter boards.

The one or more daughter boards can receive the 1PPS signal from FPGA. For daughter boards, the 1PPS signal is enough to keep them synchronized with the OS. The one or more daughter boards can also detect digital input (DI) events, and each DI event message can carry an accurate timestamp to indicate the sequence of events by using the time deviation between the DI event and the rising edge of the 1PPS signal. The one or more daughter boards then can actively transmit the DI event message and the timestamp to the main board based on detecting the DI event. The timing for one or more daughter boards to transmit the DI event message to the OS will be described in detail below with reference to FIG. 2.

Figure 2A:
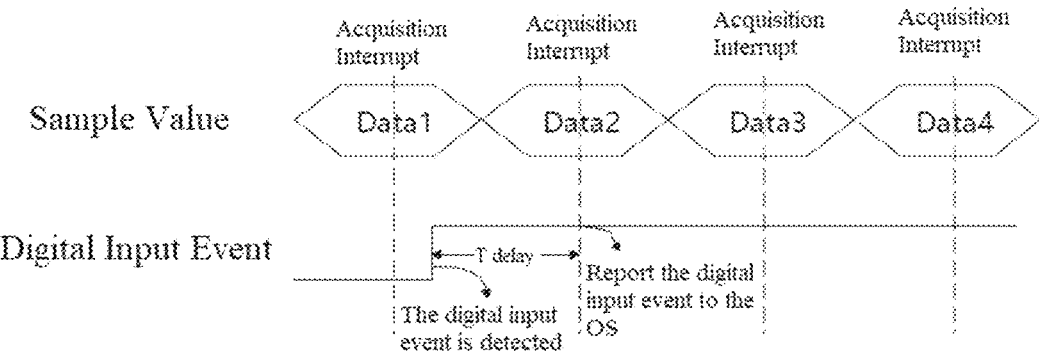
FIGS. 2A and 2B illustrate timing diagrams of transmitting an event message by daughter boards to a main board in the example system of FIG. 1.
Figure 2B:
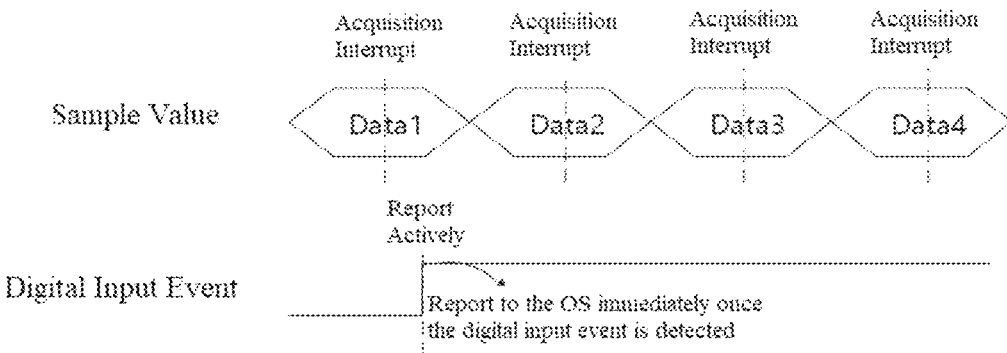

FIGS. 2A and 2B illustrate timing diagrams of transmitting an event message by daughter boards to the main board in the example system of FIG. 1. FIG. 2A illustrates the timing diagrams of acquiring DI event by OS sampling in the case of synchronous acquisition, and FIG. 2B illustrates the timing diagrams of transmitting an DI event message to the OS actively by the daughter boards.

Referring to FIG. 2A, in the case of synchronous acquisition, the FPGA does not transmit a 1PPS signal to the daughter boards. When detecting a DI event, the daughter boards cannot transmit a DI event message to the OS immediately, but the OS on the main board samples the DI event at the interrupt timing, which results in a delay T between the detection of the DI event and the acquisition of the DI event by the OS. In addition, because DI events can only be obtained by OS sampling at the interrupt timing, the OS cannot obtain DI events between the previous interrupt timing and the next interrupt timing. If the DI event changes several times between the two interrupt timings, these messages will be lost because OS cannot obtain them.

Referring to FIG. 2B, in the case that the daughter boards transmit the DI message actively, because the FPGA transmits a 1PPS signal to the daughter boards, the daughter boards can generate a timestamp and transmit the DI event message to the OS actively by using the timestamp when detecting the DI event. The timestamp indicates the time deviation between the DI event and the rising edge of the 1PPS signal. In some embodiments, the daughter boards receive 1PPS, generate a timestamp indicating the time deviation between the DI event and the rising edge of the 1PPS signal when detecting the DI event, and transmit the DI event message and the timestamp to the OS on the main board actively.

Figure 3:
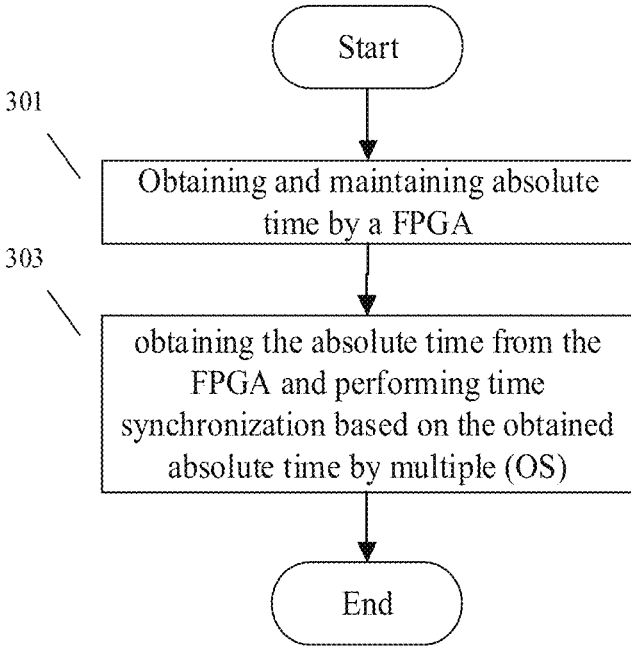
FIG. 3 illustrates a flowchart of an example method of time synchronization between multiple operating systems according to an embodiment of the present disclosure.

FIG. 3 illustrates a flowchart of an example method of time synchronization between multiple operating systems according to an embodiment of the present disclosure.

Referring to FIG. 3, at block 301, the absolute time is obtained and maintained by the FPGA.

In some embodiments, obtaining the absolute time by FPGA may include obtaining time information from the one or more external clock sources and decoding the time information to obtain the absolute time. In other embodiments, for some types of clock sources, FPGA cannot acquire and decode the time information independently, so one of the multiple OSs participates in the processing of the time information and provides the absolute time to the FPGA.

In some embodiments, after obtaining the absolute time, the FPGA can increase the absolute time by an internal counter based on an oscillator. The oscillator, the internal counter, multiple OSs, and the FPGA may be disposed on a main board.

At block 303, the absolute time is obtained from FPGA and time synchronization is performed based on the absolute time by multiple OSs.

In some embodiments, the FPGA can also transmit a 1PPS signal to the daughter boards. When detecting the DI event, the daughter boards can generate a timestamp based on the time deviation between the DI event and the rising edge of the 1PPS signal, and transmit the DI event message and the timestamp to the OS on the main board actively by using the timestamp. In this way, when the DI event is detected, the DI event message can be transmitting to the OS actively without waiting to be sampled by the OS at the interrupt timing, which eliminates the delay between the detection of the DI event and obtaining the DI event message by the OS, and avoids that the OS cannot obtain all the DI events.

An example system according to the present disclosure can be disposed in a protection relay device and an example method according to the present disclosure can be performed by the protection relay device, which can provide the following advantages.

For customers, on the one hand, multiple OSs can obtain absolute time from a FPGA, which can make the multiple OSs generate more accurate timestamps. More accurate timestamps in different operating systems can be provided to event log, fault log and disturbance record, which can help the customers to get fault investigation results more easily and quickly. On the other hand, maintaining the absolute time by the FPGA instead of one OS of the multiple OSs can decrease the CPU load, which can ensure that the device can get a better protection performance. On the other hand, the performance of the protection algorithm can be increased by more accurate time synchronization between the multiple OSs.

For development, on the one hand, the time maintainer function of FPGA makes it serve as a time master for the whole device. Each OS or daughter board can obtain high accuracy absolute time easily by accessing the time register of FPGA with low delay time, which leads to a high time synchronization system device with high scalability. On the other hand, the advantage of different OS can be gathered without worrying about time synchronization. On the other hand, once the event message is detected, it can be transmitted to the main boards actively by the daughter boards instead of waiting to be sample synchronously by the OS passively, which improves the real-time performance of the device.

For software verification and validation (V&V), on the one hand, it is easier for V&V model to determine the time accuracy by detecting 1PPS signal output by FPGA. On the other hand, more precise timestamps can help V&V model to complete the test result analysis.

It should be noted that for the sake of clarity and conciseness, only the parts related to embodiments of the present invention are shown in FIGS. 1 to 3, but it should be understood by those skilled in the art that the devices or apparatus shown in FIGS. 1 to 3 may include other necessary units.

Those skilled in the art can realize that the units and algorithm steps of each example described in connection with the embodiments disclosed herein can be realized by electronic hardware, computer software or a combination of both. In order to illustrate the interchangeability of hardware and software clearly, the components and steps of each example have been generally described in terms of functions in the above description. Whether these functions implemented in hardware or software depends on the specific application and design constraints of the technical scheme.

Those skilled in the art can use different methods to realize the described functions for each specific application, but this implementation should not be considered beyond the scope of the present invention.

It can be clearly understood by those skilled in the art that for the convenience and conciseness of description, the specific working processes of the systems, devices, and units described above can refer to the corresponding processes in the aforementioned method embodiments and will not be repeated here.

In several embodiments provided by this application, it should be understood that the disclosed systems, devices, and methods can be realized in other ways. For example, the embodiment described above for device is only exemplary. For example, the division of the units is only a logical function division. In actual implementation, there may be other division methods, such as multiple units or components that can be combined or integrated into another system, or some features can be ignored or not implemented. On the other hand, the mutual coupling or direct coupling or communication connection shown or discussed can be indirect coupling or communication connection through some interfaces, devices, or units, which can be electrical, mechanical or in other forms.

The units described as separate components may or may not be physically separated, and the components displayed as units may or may not be physical units, which may be located in one place or distributed to multiple network units. Some or all of the units can be selected according to actual needs to achieve the purpose of this embodiment.

In addition, each functional unit in each embodiment of the present invention may be integrated into one processing unit, or each unit may exist physically separated, or two or more units may be integrated into one unit. The above integrated units can be realized in the form of hardware or software functional units.

The integrated unit can be stored in a computer-readable storage medium if it is realized in the form of a software functional unit and sold or used as an independent product. Based on such understanding, the technical solution of the present invention can be embodied in the form of a software product, which is stored in a storage medium and includes several instructions to make a computer device (which can be a personal computer, a server, a network device, etc.) execute all or part of the steps of the method described in various embodiments of the present invention. The aforementioned storage media includes: U disk, mobile hard disk, Read-Only Memory (ROM), Random Access Memory (RAM), magnetic disk or optical disk and other media that can store program codes.

The above is only the specific embodiment of the present invention, but the scope of protection of the present invention is not limited to this. Any person familiar with the technical field can easily think of changes or substitutions within the technical scope disclosed by the present invention, which should be included in the scope of protection of the present invention. Therefore, the scope of protection of the present invention should be based on the scope of protection of the claims.

The invention claimed is:

1. A system for time synchronization between multiple operating systems, the system comprising:

a Field Programmable Gate Array (FPGA) configured to obtain and maintain absolute time;

multiple operating systems configured to obtain the absolute time from the FPGA and perform time synchronization based on the obtained absolute time;

a main board comprising an oscillator and an internal counter, wherein the FPGA configured to maintain the absolute time comprises the FPGA configured to increase the absolute time, by the internal counter, based on the oscillator on the main board; and one or more daughter boards coupled to the main board, and wherein:

the FPGA is further configured to transmit a one pulse per second (1PPS) signal to the one or more daughter boards, and the one or more daughter boards are configured to:

receive the 1PPS signal;

detect a digital input (DI) event when the multiple operating systems obtain the absolute time from the FPGA;

generate a timestamp indicative of a time deviation between a rising edge of the 1PPS signal and the detection of the DI event; and transmit a DI event message and the timestamp to the main board based on detecting the DI event.

2. The system of claim 1, further comprising one or more external clock sources.

3. The system of claim 2, wherein the FPGA configured to obtain the absolute time comprises the FPGA configured to:

obtain time information from one of the one or more external clock sources and decode the time information to obtain the absolute time; and/or obtain the absolute time from one of the multiple operating systems.

4. The system of claim 1, wherein the FPGA and the multiple operating systems are disposed on the main board.

5. The system of claim 1, wherein the FPGA is configured to generate the DI event.

6. The system of claim 5, wherein the one or more daughter boards detecting the DI event comprises the one or more daughter boards receiving the DI event from the FPGA.

7. A method for time synchronization between multiple operating systems associated with a system, the method comprising:

obtaining and maintaining absolute time by a Field Programmable Gate Array (FPGA);

obtaining the absolute time from the FPGA and performing time synchronization based on the obtained absolute time by multiple operating systems, wherein the system comprises the FPGA, the multiple operating systems, a main board and one or more daughter boards coupled to the main board, the main board comprising an oscillator and an internal counter, and maintaining the absolute time by the FPGA comprises increasing the absolute time, by the internal counter, based on the oscillator on the main board, and the method further comprising:

transmitting a one pulse per second (1PPS) signal by the FPGA to one or more daughter boards, and by the one or more daughter boards:

receiving the 1PPS signal;

detecting a digital input (DI) event when the multiple operating systems obtain the absolute time from the FPGA;

generating a timestamp indicative of a time deviation between a rising edge of the 1PPS and the detecting of the DI event; and transmitting a DI event message and the timestamp to the main board based on detecting the DI event.

8. The method of claim 7, wherein obtaining the absolute time by the FPGA comprises:

obtaining time information from one of one or more external clock sources and decoding the time information to obtain the absolute time; and/or obtaining the absolute time from one of the multiple operating systems.

9. The method of claim 7, wherein the FPGA and the multiple operating systems are disposed on the main board.

10. The method of claim 7, further comprising generating the DI event using the FPGA.

11. The method of claim 10, wherein the one or more daughter boards detecting the DI event comprises the one or more daughter boards receiving the DI event from the FPGA.

12. At least one computer-readable storage medium comprising processor executable instructions that, when executed by a Field Programmable Gate Array (FPGA) of a main board, cause the FPGA to:

obtain and maintain absolute time using an oscillator and an internal counter, wherein maintaining the absolute time comprises increasing the absolute time, by the internal counter, based on the oscillator on the main board;

output the absolute time to multiple operating systems to perform time synchronization between the FPGA and the operating systems; and cause transmission of a one pulse per second (1PPS) signal to one or more daughter boards to cause the one or more daughter boards to:

receive the 1PPS signal;

detect a digital input (DI) event when the multiple operating systems obtain the absolute time from the FPGA;

generate a timestamp indicative of a time deviation between a rising edge of the 1PPS and the detection of the DI event; and transmit a DI event message and the timestamp to the main board.

13. The at least one computer-readable storage medium of claim 12, wherein obtaining the absolute time by the FPGA comprises:

obtaining time information from one of one or more external clock sources and decoding the time information to obtain the absolute time; and/or obtaining the absolute time from one of the multiple operating systems.

14. The at least one computer-readable storage medium of claim 12, wherein the processor executable instructions cause the FPGA to generate the DI event.

15. The at least one computer-readable storage medium of claim 14, wherein the one or more daughter boards detecting the DI event comprises the one or more daughter boards receiving the DI event from the FPGA.

* * * * *